(12) United States Patent
Higashi

(10) Patent No.: US 7,891,270 B2
(45) Date of Patent: Feb. 22, 2011

(54) GRIP

(75) Inventor: Yumiko Higashi, Niiza (JP)

(73) Assignee: Honda Access Corp., Niiza-shi (JP)

( * ) Notice: Subject to any disclaimer, the term of this patent is extended or adjusted under 35 U.S.C. 154(b) by 1134 days.

(21) Appl. No.: 11/283,893

(22) Filed: Nov. 22, 2005

(65) Prior Publication Data

US 2006/0246789 A1 Nov. 2, 2006

(30) Foreign Application Priority Data

Apr. 28, 2005 (JP) .............................. 2005-133286

(51) Int. Cl.
*B62K 21/26* (2006.01)
*B25G 1/10* (2006.01)
*B60L 1/02* (2006.01)
*H05B 3/08* (2006.01)

(52) U.S. Cl. .......................... 74/551.9; 16/421; 16/431; 219/202; 219/204; 219/541

(58) Field of Classification Search ............... 74/551.9, 74/551.8, 563, 473.16; 180/230, 219; 16/421, 16/431; 279/62, 473.16; 219/202, 204, 533, 219/541, 542
See application file for complete search history.

(56) References Cited

U.S. PATENT DOCUMENTS

| 4,061,051 A * | 12/1977 | Grandis .................... 74/473.16 |
| 4,416,166 A * | 11/1983 | Jannard et al. ............. 74/551.9 |
| 5,261,665 A * | 11/1993 | Downey ..................... 473/303 |
| 5,613,407 A | 3/1997 | Ogata |
| 5,626,780 A | 5/1997 | Ogata |
| 5,673,597 A * | 10/1997 | Lin .............................. 74/563 |
| 5,735,037 A | 4/1998 | Ogata |
| 5,823,069 A * | 10/1998 | Roark et al. ............... 74/551.9 |
| 5,834,734 A | 11/1998 | Ogata |
| 6,035,742 A * | 3/2000 | Hollingsworth et al. ..... 74/551.9 |
| 6,105,460 A * | 8/2000 | Li ............................. 74/551.9 |
| 6,114,668 A | 9/2000 | Ogata et al. |
| 6,394,214 B1 * | 5/2002 | Hahm ........................ 180/230 |
| 6,622,592 B2 * | 9/2003 | Lee ............................. 74/563 |
| 6,686,572 B1 | 2/2004 | Wu |
| 6,844,524 B2 | 1/2005 | Downey et al. |
| 7,264,255 B1 * | 9/2007 | Winfrey ...................... 180/219 |
| 7,325,812 B2 * | 2/2008 | Long et al. .................... 279/62 |
| 7,347,121 B2 * | 3/2008 | Wu ........................... 74/551.9 |
| 2006/0248683 A1 * | 11/2006 | Ohishi et al. .................. 16/421 |
| 2007/0007266 A1 * | 1/2007 | Sasaki et al. ................ 219/202 |
| 2007/0113380 A1 * | 5/2007 | Lee et al. ...................... 16/431 |
| 2008/0116188 A1 * | 5/2008 | Fukuda et al. .............. 219/204 |

OTHER PUBLICATIONS

Webster's Third New International Dictionary of the English Language Unabridged, 1968, pp. 1000 and 1932.*

* cited by examiner

*Primary Examiner*—Vinh T. Luong
(74) *Attorney, Agent, or Firm*—Westerman, Hattori, Daniels & Adrian, LLP

(57) ABSTRACT

A grip includes a grip body to be fitted on a mounting portion. The grip body includes an inner piece, an outer casing mounted on the inner piece, and a resin member fitted on the inner piece so as to be exposed through an opening, such as a hole or a cutout provided in the outer casing. The resin member is inserted in the outer casing so as to be partly exposed through the opening, and the inner piece is then inserted in the resin member fitted in the outer casing.

7 Claims, 5 Drawing Sheets

GRIP

BACKGROUND OF THE INVENTION

1. Field of the Invention

The present invention relates to operation handles for use in vehicles, such as motorcycles, four- or three-wheeled buggies, snowmobiles, and water vehicles, and to grips mounted as these operation handles.

2. Description of the Related Art

In order to improve the design and grippability, it is desirable that a grip include a metal outer housing and an elastic resin portion, instead of being entirely made of rubber. For example, the resin portion is made of rubber, and is exposed from an opening, such as a hole (e.g., a slit) or a cutout, provided in the metal outer casing.

In particular, it is desirable that the resin portion slightly protrude from a metal surface portion of the casing. Front and rear surfaces of a cylindrical inner piece serving as a core of a grip, which is to be fitted in a mounting portion of a handle pipe or a throttle pipe, are covered with resin by molding. However, it becomes more difficult to press-fit the resin (rubber)-molded inner piece into the outer casing (in other words, to cover the inner piece with the outer casing) as the amount of protrusion of the resin portion from the metal surface portion (opening of the outer casing) increases.

For this reason, the protrusion cannot be achieved by such simple assembly using resin molding and fitting (covering), and it is difficult to commercialize grips at a low cost.

SUMMARY OF THE INVENTION

Accordingly, it is an object of the present invention to provide an innovative grip that includes an inner piece as a core, as before, and that can be easily attached to a mounting portion. When the grip is of a heater-integrated type, a heater is provided in the inner piece (for example, a string-shaped heater is wound around the inner piece), and is resin-molded together with the inner piece, as before. Separately from the resin used to resin-mold the inner piece, a resin member is provided so as to be fitted in an outer casing so that a resin portion is exposed from an opening provided in the outer casing. The resin member is fitted in the outer casing, and the inner piece (for example, a resin-molded inner piece) is then fitted in the resin member covered with the outer casing, thereby constructing a grip body by simple assembly using fitting and covering as before. Moreover, even when the elastic resin portion is exposed and protrudes from the opening of the outer casing, the resin member can be easily press-fitted (inserted) in the outer casing because it can deform toward an inner cavity. Consequently, the resin portion can protrude from the metal surface portion, and the design and grippability can be substantially improved even when the grip is simply assembled.

In order to achieve the above object, a grip according to an aspect of the present invention includes a grip body to be fitted on a mounting portion, wherein the grip body includes an inner piece, an outer casing mounted on the inner piece, and a resin member fitted on the inner piece so as to be exposed through an opening, such as a hole or a cutout provided in the outer casing, wherein the resin member is inserted in the outer casing so as to be partly exposed through the opening, and the inner piece is then inserted in the resin member fitted in the outer casing.

As described above, the grip body is formed by inserting the resin member in the outer casing, and inserting the inner piece (which may be resin-molded) into the resin member which is fitted in the outer casing. Therefore, for example, when the outer casing is made of metal, a grip including a metal surface portion and a resin surface portion and having improved design and grippability can be simply assembled and easily produced at a low cost.

The resin member to be exposed is not molded with the inner piece, but is formed separately from the inner piece. Therefore, the grip body can be simply assembled by inserting the resin member in the outer casing so that the resin member is exposed through the opening of the outer casing, and inserting the inner piece (which may be resin-molded) into the resin member covered with the outer casing.

Preferably, the resin member is cylindrical and made of an elastic material such as rubber, and is press-fitted in the outer casing so that a protrusion provided thereon protrudes from the opening.

In this case, even when the resin portion protrudes from the surface of the outer casing through the opening in order to further improve the design and grippability, the inner piece does not exist inside the resin member during press fitting, and the resin member can deform into an inner cavity. Therefore, the resin member can be easily press-fitted in the outer casing so that the resin surface portion protrudes from the surface of the outer casing through the opening.

Accordingly, it is possible to simply assemble a grip with improved design and high grippability in which the resin portion protrudes from the metal surface portion.

Preferably, a heater is disposed on a surface of the inner piece, at least the surface of the inner piece is covered with resin so that the heater is embedded in the surface, and the inner piece covered with the resin is inserted in the resin member fitted in the outer casing.

In this case, it is possible to easily achieve a heater-integrated grip.

That is, the grip includes the inner piece serving as the core, as before, and is easily fitted on the mounting portion, and the heater is provided in the inner piece, and is resin-molded, as before. Therefore, in the heater-integrated grip, for example, a rubber portion is exposed and protrudes from the metal surface portion, and this improves the design and grippability.

Preferably, the outer casing is made of metal, and the opening is provided in a surface of the outer casing.

In this case, the grip includes a metal surface portion and a resin surface portion, and this further improves the design and grippability.

Preferably, a base collar is connected to the inner piece fitted in the resin member and the outer casing to constitute the grip body.

This further improves the design and grippability.

Preferably, the base collar is connected to the inner piece so as not to rotate, and a retaining piece protrudes from an edge of the outer casing so as to be retained in a receiving portion provided in the base collar in order to retain the outer casing in the base collar so as not to rotate.

In this case, the base collar and the grip body are reliably connected so as not to rotate relative to each other. In particular, even when the outer casing is made cylindrical in order to ensure superior design and high grippability, it can be held firmly.

That is, the base collar and the inner piece are connected so as not to rotate relative to each other. In addition, for example, the outer casing press-fitted and fixed by bonding is also fixed by the engagement between the retaining piece and the receiving portion. Therefore, the outer casing can be made cylindrical to further improve the design and grippability, and the fixing strength is extremely increased.

DESCRIPTION OF THE PREFERRED EMBODIMENTS

Figure 1:
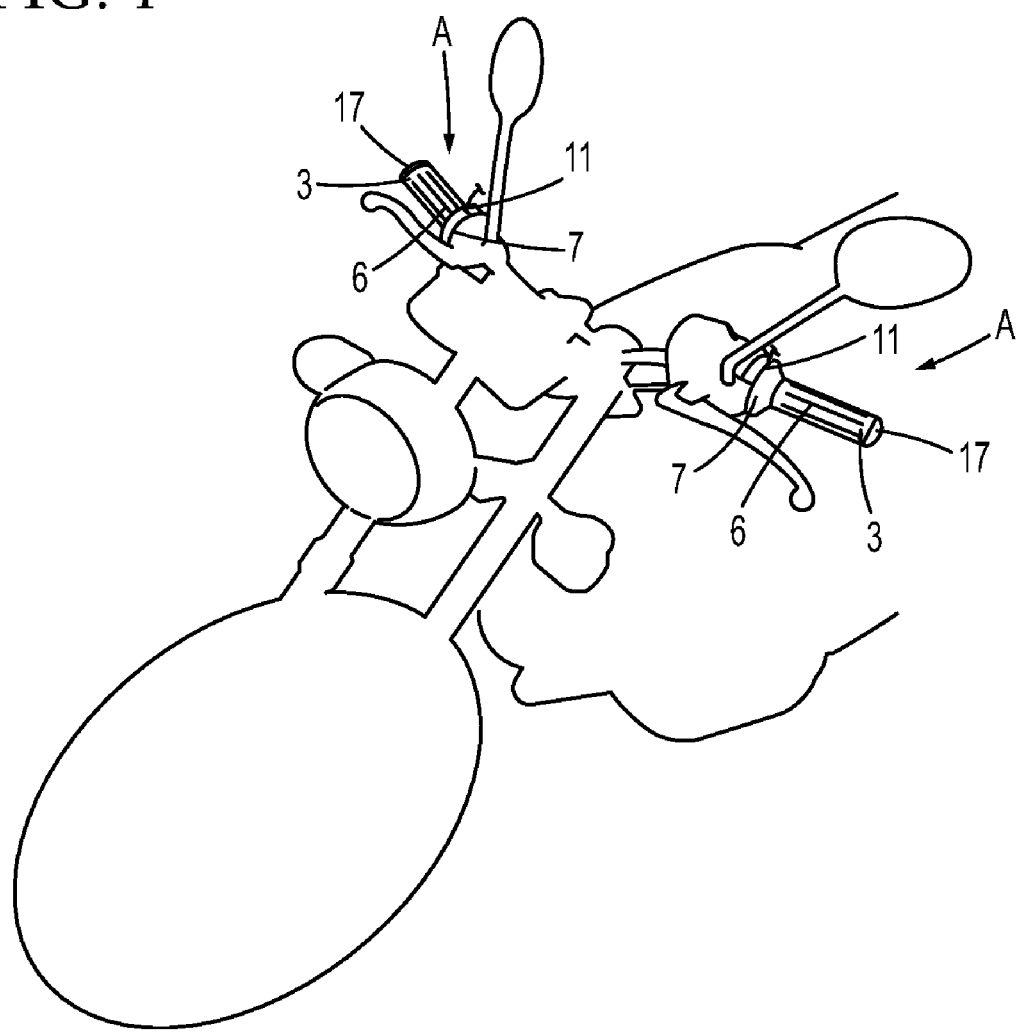
FIG. 1 is an explanatory perspective view showing a use state of a grip according to an embodiment of the present invention.

A preferred embodiment of the present invention (how to carry out the present invention) will be briefly described in conjunction of the operation of the invention with reference to FIGS. 1 to 6.

In a grip, a resin member 6 is fitted in an outer casing 3 so as to be partly exposed from openings 5, such as holes or cutouts, provided in the outer casing 3.

That is, the resin member 6 to be exposed is not molded with an inner piece 2, but is formed separately from the inner piece 2. The resin member 6 is inserted in the outer casing 3 so as to be exposed through the openings 5 of the outer casing 3, and the inner piece 2 (which may be resin-molded) is then inserted in the resin member 6 covered with the outer casing 3, thus constructing a grip body A.

Since the resin member 6 is inserted in the outer casing 3 before the inner piece 2 is inserted therein, even when portions of the resin member 6 protrude from the openings 5 of the outer casing 3 in order to further improve the design and grippability, the resin member 6 can deform toward an inner cavity because the inner piece 2 does not lie inside the resin member 6. Therefore, the resin member 6 can be easily press-fitted in the outer casing 3, and the resin portions can protrude from the surface of the outer casing 3 through the openings 5.

For example, when the outer casing 3 is made of metal, a grip body A having metal surface portions and a resin metal portion on its surface can be easily produced by press-fitting the resin member 6 in the outer casing 3 and inserting the inner piece 2 in the resin member 6. Moreover, the resin surface portions can be easily caused to protrude from the metal surface portion by simple assembly.

Grips of various designs can be easily produced, for example, by simply changing the shape of the outer casing 3 and the shape and positions of the openings 5, and correspondingly changing the shape of the resin member 6. Moreover, a grip having an improved design and high grippability, in which resin surface portions protrude from a metal surface portion, as described above, can be assembled by simply press-fitting the resin member 6 in the outer casing 3 and inserting the inner piece 2 in the resin member 6 covered with the outer casing 3. Such a grip in which the resin portions are exposed and protrude from the openings 5 of the outer casing 3 can be provided at a low cost.

In order to obtain a heater-integrated grip, for example, a heater 1 shaped like a string is wound around the inner piece 2 or is routed in a predetermined range, or a film-shaped sheet heater 1 is wound around the inner piece 2, and is subjected to resin molding, and the inner piece 2 is inserted in the resin member 6 covered with the outer casing 3. Therefore, the heater-integrated grip can be easily obtained without changing a plastic pattern for holding the heater 1. Even in the heater-integrated grip, a metal surface portion and resin surface portions can be obtained with simple assembly by design change or replacement of the outer casing 3 and the resin member 6, as described above. In addition, the above-described structure in which the resin surface portions protrude can be easily achieved by simple assembly.

For example, the design and grippability can be further improved by attaching a base collar 7 to the grip body A having this configuration.

In order to further improve the design and grippability, it is preferable that the outer casing 3 be cylindrical instead of being prismatic, to prevent the rotation of the base collar 7. In this case, however, even when the inner piece 2 is connected to the base collar 7 by an engagement between a boss and a recess so as not to rotate, or even when the components are press-fitted and fixed by, for example, an adhesive, the outer casing 3 is not so firmly fixed.

Accordingly, for example, retaining pieces 9 are provided to protrude from an edge of the outer casing 3, and are fitted in receiving portions 8 provided in the base collar 7. The base collar 7 and the grip body A are thereby reliably connected so as not to rotate relative to each other. In particular, even when the outer casing 3 is made cylindrical to improve the design and grippability, it can be held firmly.

The embodiment of the present invention will be more specifically described with reference to the drawings.

The grip has a heater therein (in such a heater-integrated grip, a wire lead-out portion 11 may be provided on a base collar 7 which will be described below). A plurality of elastic resin surface portions shaped like ribs are arranged in the circumferential direction so as to protrude from a metal surface portion. This improves the design and grippability, and increases the slip resistance.

Figure 2:
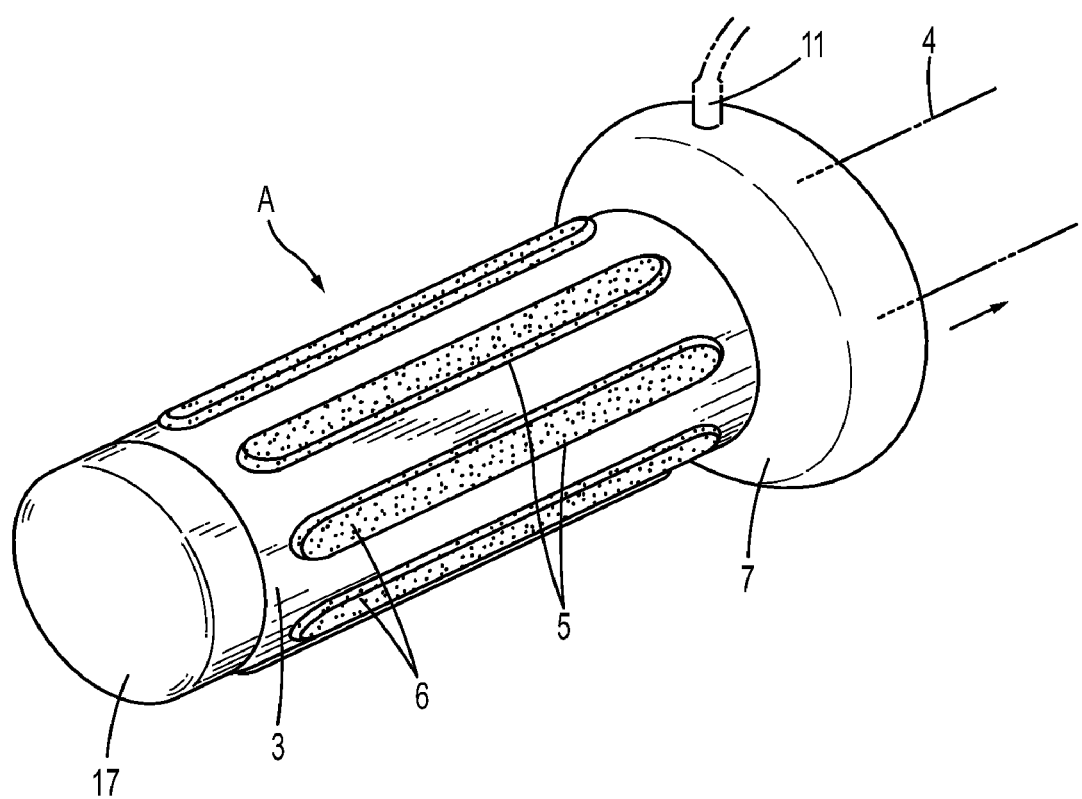
FIG. 2 is a perspective view of the grip.
Figure 4:
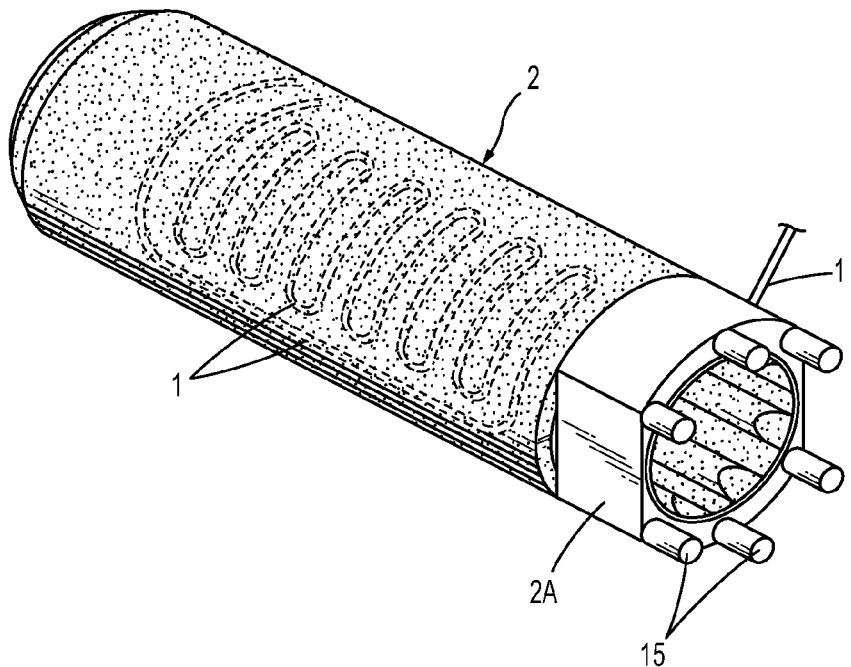
FIG. 4 is a perspective view of a resin-molded inner piece.
Figure 5:
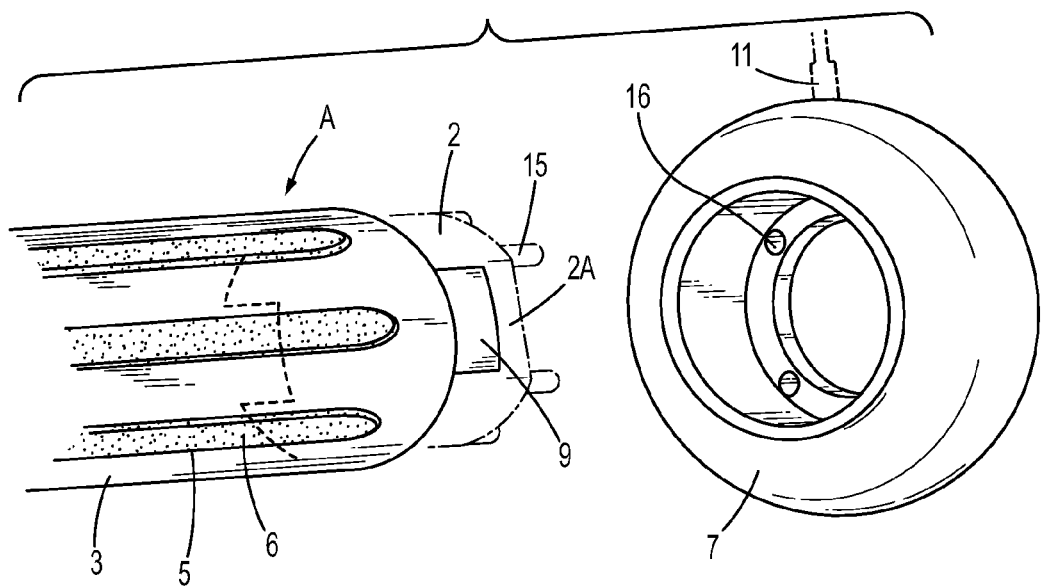
FIG. 5 is an exploded explanatory perspective view showing the retainment of a base collar and an outer casing in the grip.
Figure 6:
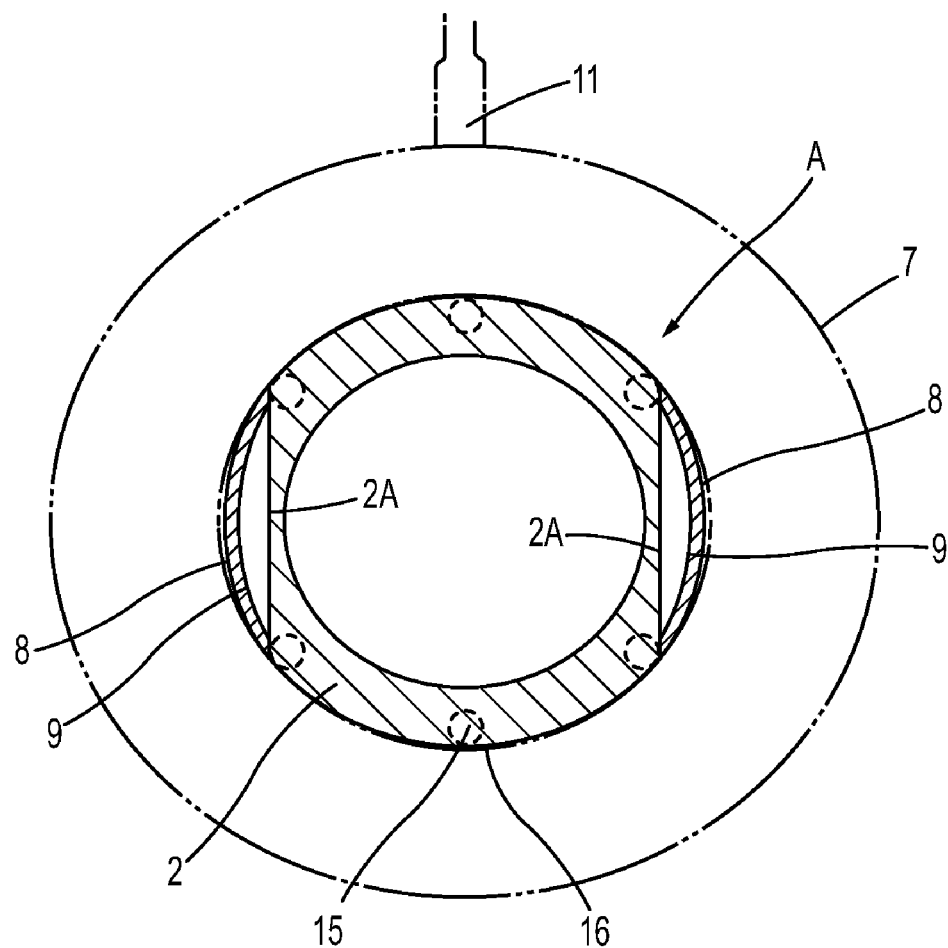
FIG. 6 is an explanatory sectional view showing the retainment of the base collar and a grip body.

An inner piece 2 including a heater 1, as shown in FIG. 4, is cylindrical, is made of hard resin, and serves as a core of a grip body A. For example, when the grip is applied to a handle of a motorcycle, as shown in FIG. 1, the inner piece 2 is fitted on a mounting portion 4 such as a handle pipe or a throttle pipe, as shown in FIG. 2.

A heater 1 shaped like a string is uniformly arranged or wound around the surface of the inner piece 2, as shown in FIG. 4, or a film-shaped sheet heater produced beforehand is wound therearound, and, for example, the inner piece 2 and the heater 1 are resin-molded in a molding die so that the heater 1 is embedded in the inner piece 2.

By resin molding, the outer surface of the inner piece 2 is covered with resin. In order to increase the covering strength of resin and to increase the force for holding the heater 1, resin may also be applied to the inner surface of the inner piece 2 through resin distributing holes so that resin on the outer surface and resin on the inner surface are combined.

The grip body A having a heater therein is constructed by fitting an outer casing 3 onto the inner piece 2 resin-molded with the heater 1. In this embodiment, resin surface portions protrude from a metal surface portion of the grip body A in order to improve the design and grippability.

Figure 3A:
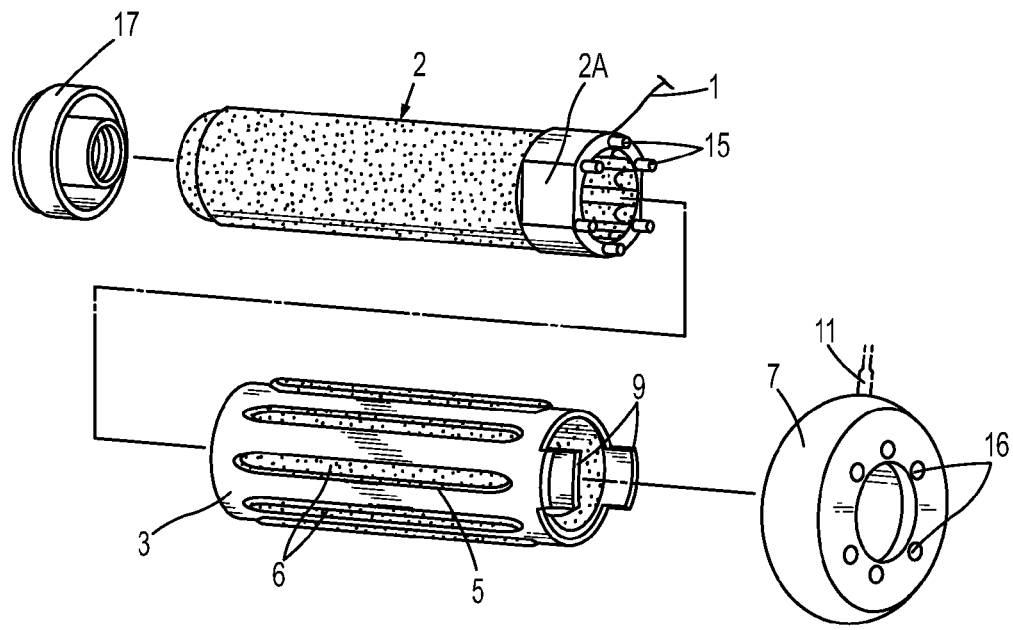
FIGS. 3A and 3B are exploded explanatory perspective views of the grip.
Figure 3B:
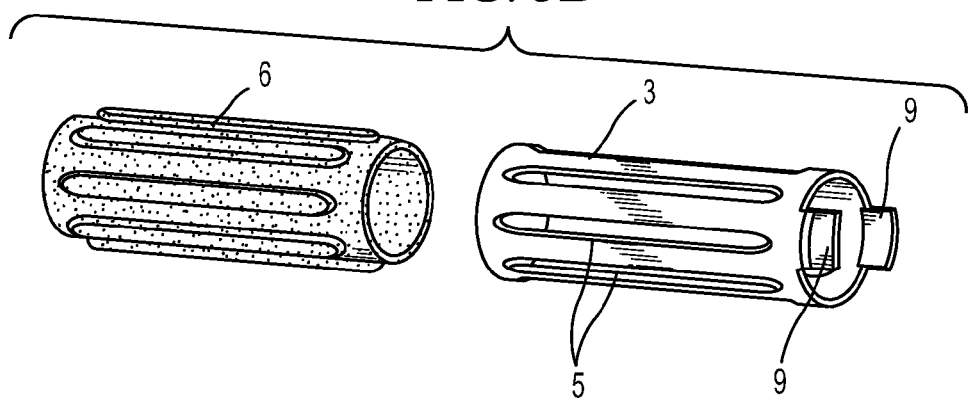

For that purpose, the outer casing 3 is cylindrical and made of metal, and has multiple long slits serving as openings 5 spaced in the circumferential direction, as shown in FIGS. 3A and 3B. The resin surface portions protrude and are exposed through the openings 5.

Even when an attempt is made to press-fit the inner piece 2 (which might be resin-molded) into the metal outer casing 3 without resin member 6, press-fitting is impossible because the inner piece 2 is hard, and it is difficult for the resin surface portions of such an inner piece 2 to protrude through the openings 5 of outer casing 3.

Accordingly, in this embodiment, a molding die for resin-molding the inner piece 2 is not changed, and an elastic cylindrical resin member 6 shown in FIGS. 3A and 3B is resin-molded by using another die. The resin member 6 is press-fitted in the outer casing 3, and is then fitted on the inner piece 2.

Projecting ribs serving as the resin surface portions are provided on the surface of the cylindrical resin member 6 designed and produced as an independent part. The resin member 6 is press-fitted in the outer casing 3 so that the projecting ribs protrude from the openings 5 of the outer casing 3.

Before the inner piece 2 is inserted in the resin member 6, only the resin member 6 is press-fitted in the outer casing 3. Inside the resin member 6, a cavity is provided, but a hard member, such as the inner piece 2, is not present. Therefore, the resin member 6 can deform inward, and it is sufficiently possible to press-fit the resin member 6 in the outer casing 3 so that elastic resin (rubber) protrudes from the openings 5.

After the resin member 6 is press-fitted in the outer casing 3 and both the members are reinforced by an adhesive, the resin-molded inner piece 2 is inserted in the resin member 6 and both the members are reinforced by an adhesive, so that the grip body A is constructed. Therefore, the grip body A can be easily assembled with a desired design and at low cost by changing the design of the outer casing 3 and the resin member 6 or replacing these parts without changing the inner piece 2 or the molding die for the inner piece 2.

Furthermore, the inner piece 2 is made of a resin harder than the resin member 6, and the resin member 6 is made of rubber softer than the inner piece 2. More specifically, for example, the inner piece 2 is made of polybutylene terephthalate (PBT), and the resin member 6 is made of a mixture of acrylonitrile (NBR) and polyvinyl chloride (PVC).

As shown in FIGS. 2, 3A, 3B and 5, a base collar 7 is attached to the grip body A. That is, the grip is formed by connecting the base collar 7 and the grip body A, and closing one end of the grip body A by a cap 17. A plurality of bosses 15 are provided at one end of the inner piece 2, and boss-engaging portions 16 are provided in the base collar 7 so that the bosses 15 are fitted therein. The bosses 15 and the boss-engaging portions 16 are engaged and bonded, or are engaged and welded by melting the bosses 15. Consequently, the base collar 7 and the inner piece 2 are firmly connected and fixed, and an edge of the outer casing 3 abuts on the base collar 7.

The outer casing 3 may be shaped to be square in cross section, and an edge thereof may be fitted in the base collar 7 so that the outer casing 3 and the base collar 7 do not rotate relative to each other. However, when the outer casing 3 is square in cross section, the design may be marred and grippability may be reduced. Accordingly, in this embodiment, the outer casing 3 is cylindrical, and the edge thereof abuts on the base collar 7.

The inner piece 2 is fitted in and bonded to the resin member 6, and the resin member 6 is press-fitted in and bonded to the outer casing 3. However, a load in the rotating direction is put on the grip by a gripping force and a throttle-operating force, and therefore, a plurality of retaining pieces 9 protrude from the edge of the outer casing 3, receiving portions 8 are provided in the base collar 7, and the retaining pieces 9 are fitted in the receiving portions 8 so that the outer casing 3 is retained by the base collar 7 so as not to rotate. More specifically, an end portion of the inner piece 2 is shaped to have a plurality of flat cut sides (for example, having a cross-sectional shape of two parallel lines 2A connected by two circular arcs), and the spaces between the cut sides 2A and the base collar 7 serve as the receiving portions 8. The retaining pieces 9 protrude from the edge of the outer casing 3, and are shaped so as to fit the receiving portions 8. The retaining pieces 9 protrude in the longitudinal direction (toward the base collar 7) so as to be slightly bent inward at a base and to be curved in an arc shape. When the inner piece 2 is fitted in the resin member 6, the retaining pieces 9 follow the flat cut sides 2A of the inner piece 2 (so that the leading corner portions of the retaining pieces 9 are in pressing contact with the flat cut sides 2A). When the end of the inner piece 2 is press-fitted in the base collar 7, the leading corner portions of the retaining pieces 9 fit in the spaces between the flat cut sides 2A and the base collar 7 (receiving portions 8) while curving a little more sharply (the radius of curvature of the inner periphery of the receiving portions 8, that is, the base collar 7 is set to be slightly larger than that of the retaining pieces 9).

Therefore, the heater-integrated grip according to this embodiment is extremely practical because the design and grippability are improved by making the outer casing 3 cylindrical, and not only the inner piece 2, but also the outer casing 3 is firmly retained by the base collar 7 by making simple improvements. Moreover, the grip is innovative because it is simply assembled, as described above, and the design and grippability are substantially improved by the resin surface portions protruding from the metal surface portion.

The present invention is not limited to the above-described embodiment, and specific structures of the components may be appropriately designed.

What is claimed is:

1. A grip, comprising:
   a mounting portion;
   a grip body fitted on the mounting portion, the grip body including
      a cylindrical resin-molded inner piece that is fitted on the mounting portion;
      a cylindrical resin member formed separately from the cylindrical resin-molded inner piece and formed of a resin material that is softer than a resin material of the cylindrical resin-molded inner piece, the cylindrical resin member having a cylindrical cavity into which the cylindrical resin-molded inner piece is fitted;
      a cylindrical outer casing, the cylindrical outer casing having an opening,
      wherein the cylindrical resin member is press fitted into the cylindrical outer casing such that the cylindrical resin member deforms inwardly into the cylindrical cavity and is partly exposed through the opening in the outer casing, and the cylindrical resin-molded inner piece is inserted in the cylindrical resin member; and
      a heater disposed on a surface of the cylindrical-resin molded inner piece, at least the surface of the cylindrical resin-molded inner piece is covered with resin so that the heater is embedded in the surface, and the cylindrical resin-molded inner piece covered with the resin is inserted in the cylindrical resin member press fitted in the cylindrical outer casing.

2. The grip according to claim 1, wherein the cylindrical resin member is made of an elastic material, and is press-fitted in the cylindrical outer casing so that a protrusion provided thereon protrudes through the opening.

3. The grip according to claim 1 or 2, wherein the cylindrical outer casing is made of metal, and the opening is provided in a surface of the cylindrical outer casing.

4. The grip according to claim 1 or 2, wherein a base collar is connected to the cylindrical resin-molded inner piece fitted in the cylindrical resin member and the cylindrical outer casing to constitute the grip body.

5. The grip according to claim 3, wherein a base collar is connected to the cylindrical resin-molded inner piece fitted in the resin member and the cylindrical outer casing to constitute the grip body.

6. The grip according to claim 4, wherein the base collar is connected to the cylindrical resin-molded inner piece so as not to rotate, and a retaining piece protrudes from an edge of the cylindrical outer casing so as to be retained in a receiving portion provided in the base collar in order to retain the cylindrical outer casing in the base collar so as not to rotate.

7. The grip according to claim 3, wherein a base collar is connected to the cylindrical resin-molded inner piece fitted in the cylindrical resin member and the cylindrical outer casing to constitute the grip body.

* * * * *